US012547475B2

(12) United States Patent
Kinsey et al.

(10) Patent No.: US 12,547,475 B2
(45) Date of Patent: Feb. 10, 2026

(54) DISTRIBUTED DATA STORAGE SYSTEM WITH PEER-TO-PEER OPTIMIZATION

(71) Applicant: Seagate Technology LLC, Fremont, CA (US)

(72) Inventors: Jason Wayne Kinsey, Longmont, CO (US); Hemant Vitthalrao Mane, Pune (IN); Niranjan Anant Pol, Pune (IN); Marc Timothy Jones, Longmont, CO (US); Jason Matthew Feist, Minneapolis, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 418 days.

(21) Appl. No.: 18/213,692

(22) Filed: Jun. 23, 2023

(65) Prior Publication Data
US 2023/0418685 A1 Dec. 28, 2023

Related U.S. Application Data

(60) Provisional application No. 63/354,941, filed on Jun. 23, 2022.

(51) Int. Cl.
*G06F 9/50* (2006.01)
*G06F 3/06* (2006.01)
*G06F 21/44* (2013.01)

(52) U.S. Cl.
CPC .......... *G06F 9/5083* (2013.01); *G06F 3/0613* (2013.01); *G06F 3/0631* (2013.01); *G06F 3/067* (2013.01); *G06F 21/44* (2013.01)

(58) Field of Classification Search
CPC ...... G06F 3/0613; G06F 3/0631; G06F 3/067; G06F 21/44
See application file for complete search history.

(56) References Cited

U.S. PATENT DOCUMENTS 5,361,362 A * 11/1994 Benkeser .............. G06F 9/4881
                                                            718/102

* cited by examiner

*Primary Examiner* — Wissam Rashid
(74) *Attorney, Agent, or Firm* — HOLZER PATEL DRENNAN

(57) ABSTRACT

Method and apparatus for offloading upstream processing tasks to peer groups of downstream data storage devices. A peer control circuit forms a peer group of storage devices in response to a detected processing bottleneck associated with a network controller. One of the storage devices in the peer group is designated as a primary device, and is responsible for interface communications, for subdividing the processing task for execution by secondary devices in the peer group, and coordinating overall execution. The peer group and the processing task are selected to avoid or minimize the processing bottleneck at the network controller level while maintaining ongoing data transfer performance at the storage device level. A list of available device resources and capabilities may be maintained by the peer control circuit. Offloaded tasks can include data rebuilds, cryptographic functions, new device authentication operations, and the like. Multiple overlapping peer groups can be formed as needed.

20 Claims, 4 Drawing Sheets

DISTRIBUTED DATA STORAGE SYSTEM WITH PEER-TO-PEER OPTIMIZATION

RELATED APPLICATION

The present application makes a claim of domestic priority to U.S. Provisional Patent Application No. 63/354,941 filed Jun. 23, 2022, the contents of which are hereby incorporated by reference.

SUMMARY

Various embodiments of the present disclosure are generally directed to optimization of system performance by assigning and managing execution of tasks among devices in a peer-to-peer device environment.

Without limitation, some embodiments provide a peer control circuit that forms a peer group of storage devices in response to a detected processing bottleneck associated with a network controller. One of the storage devices in the peer group is designated as a primary device, and is responsible for interface communications, for subdividing the processing task for execution by secondary devices in the peer group, and coordinating overall execution. The peer group and the processing task are selected to avoid or minimize the processing bottleneck at the network controller level while maintaining ongoing data transfer performance at the storage device level. A list of available resources and capabilities may be maintained by the peer control circuit. Offloaded tasks can include data rebuilds, cryptographic functions, new device authentication operations, and the like. Multiple overlapping peer groups can be formed as needed.

These and other features which may characterize various embodiments can be understood in view of the following detailed discussion and the accompanying drawings.

DETAILED DESCRIPTION

Figure 1:
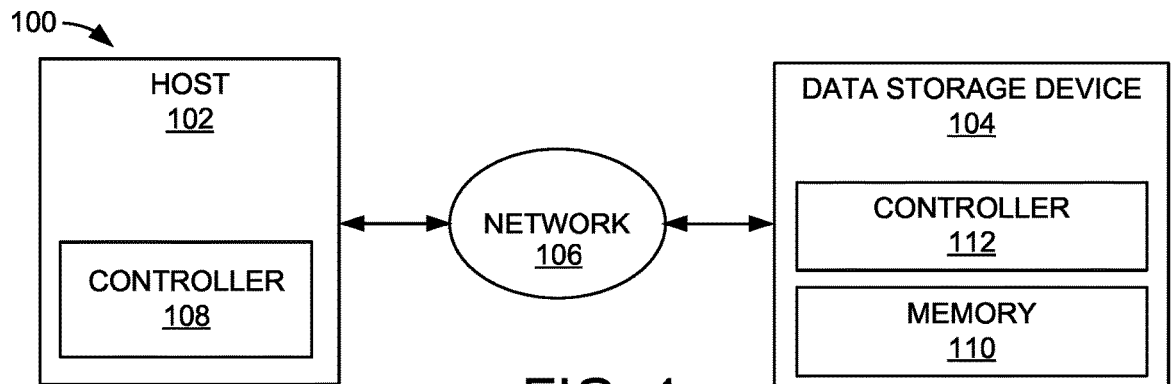
FIG. 1 depicts a block representation of an example data storage system in which various embodiments can be practiced.

Various embodiments of the present disclosure are generally directed to systems and methods for utilizing processing capabilities in downstream data storage devices to intelligently divert upstream tasks to peer groups of devices.

Digital content is created, moved, stored, and retrieved at ever increasing rates and volumes in modern computer network systems. This has led to increasingly complex data storage systems with greater data storage and transfer capabilities. This has also promoted performance bottlenecks and mismanagement of available system resources. As a result, the efficiency, security, and reliability of digital content can be impacted as less than all the capabilities of the constituent components of a system are utilized to service data storage requests, memory management operations, and data management protocol.

Throughout the present disclosure, assorted inefficiencies of a distributed data storage systems are characterized, generally, as bottlenecks where performance degradation is exacerbated as system activity volume increases. As explained below, various embodiments operate to identify actual or predicted bottlenecks and transfer system activity from a centralized network component to a peer group of data storage devices.

In one embodiment, Non-Volatile Memory Express (NVMe) techniques can be utilized in a selective master-slave configuration where a first data storage device, sometimes referred to as a master or primary device, can dictate operation of another, peer data storage device, also sometimes referred to as a slave or secondary device. It is contemplated that selective master-slave arrangements can optimize NVMe operation by allowing different peer groups to manage one another, which leaves top-level, upstream controllers to conduct higher level operations such as caching, host interactions, and security initializations.

Another embodiment utilizes peer-to-peer data storage device interactions to conduct error correction and/or data rebuilding operations without involving upstream network controllers. The ability to assign downstream data storage device processing capabilities to manage data errors, failures, and rebuilds allows diverse volumes of processing, caching, and power consumption capabilities that are not available in centralized network servers and nodes. That is, NVMe systems that utilize numerous data storage devices that each contain processing capabilities provides a vast pool of possible peer-to-peer interactions that can handle various process intensive tasks such as handling data errors and rebuilding without degrading data storage and access performance.

A peer-to-peer data storage device relationship can also allow for intelligent cryptography and security as individual data storage device controllers initialize, verify, and/or communicate to certify other data storage devices, hosts, and data as trustworthy. It is contemplated that cryptographic operations can be split between different data storage devices, which can provide a layer of added protection that is not available in centralized, network controller conducted security operations. The splitting of cryptographic operations between different data storage devices can further allow for more complex algorithms and computations as data storage devices with low pending activity can be selectively utilized to conduct some, or all, of a cryptographic operation.

The behind-the-scenes activity allowed by peer-to-peer data storage device relationships can also allow for sophisticated communications, verifications, and initializations. For instance, data storage devices can be tasked with identifying new and/or local data storage devices so that power consumption and data control can be designated in relation to the physical layout of devices. By communicating and testing connections and capabilities of a newly installed data storage device, the physical location of the data storage device can be ascertained without degrading system data access performance. The ability to determine the physical location of a data storage device allows peer-to-peer relationships to be created that leverage close physical signal pathways, such as within the same rack, physical address, or enclosure.

The peer groups may be formed on a task basis, on a controller basis, on a workload basis, or on some other basis, such as by a peer control circuit. In some cases a master-slave relationship may be established within a given peer group of data storage devices, so that a particular device within the peer group is designated as a primary interface device (e.g., master device or primary device) for the group and the remaining device(s) within the peer group operate as secondary devices (e.g., slave devices). The secondary devices carry out operations as directed by the primary device, and the primary device communicates with the peer control circuit and coordinates the overall execution of the offloaded processing task. In some cases, an offloaded processing task may be subdivided by the primary device into subtasks that are then executed by the processors of the various secondary devices under the overall coordination of the primary device.

The peer group members may be selected to ensure the processing of the offloaded processing task can be carried out without impacting ongoing data storage transfer performance of the devices. A listing of the various resources and processing capabilities of the respective devices may be maintained and used to select the members of a particular peer group, as well as which device(s) will be designated as the primary device(s), etc., based on anticipated processing requirements to accomplish the offloaded task. Various embodiments utilize a variety of alternatives, including overlapping peer groups, groups with multiple primary (master) devices, hierarchies of control levels, mechanisms whereby primary designations are modified, and so on.

Turning now to the drawings, FIG. 1 shows an example distributed data storage system 100 constructed and operated in accordance with various embodiments. The system 100 has one or more hosts 102 that are connected to one or more data storage devices 104 via one or more wired and/or wireless networks 106. While the host 102 can take a variety of forms, in at least some cases each host has a controller 108 (e.g., programmable processor, etc.) that manages operation, maintains a connection with the system 100, and generates data access requests to store and retrieve data in one or more memories 110 of the respective data storage devices 104.

Each data storage device 104 has a local controller 112 (e.g., programmable processor, etc.) that maintains data and satisfies data access requests from one or more hosts 102. For example, the data storage device 104 can employ a microprocessor and/or other programmable or hardware-based circuitry. Some embodiments allow direct submittal of data access requests to the data storage devices 104, although this can increase potential errors and latency effects, particularly when data, metadata, and/or data maps are stored across different memories 110. The storage device 104 may be arranged as a single storage device, such as a solid-state drive (SSD), hard disc drive (HDD), hybrid device, or other storage device utilizing storage media to provide a memory storage space for the system. Alternatively, the storage device 104 may be formed of an array of these or other types of storage devices, including under the control of a local storage controller.

Figure 2:
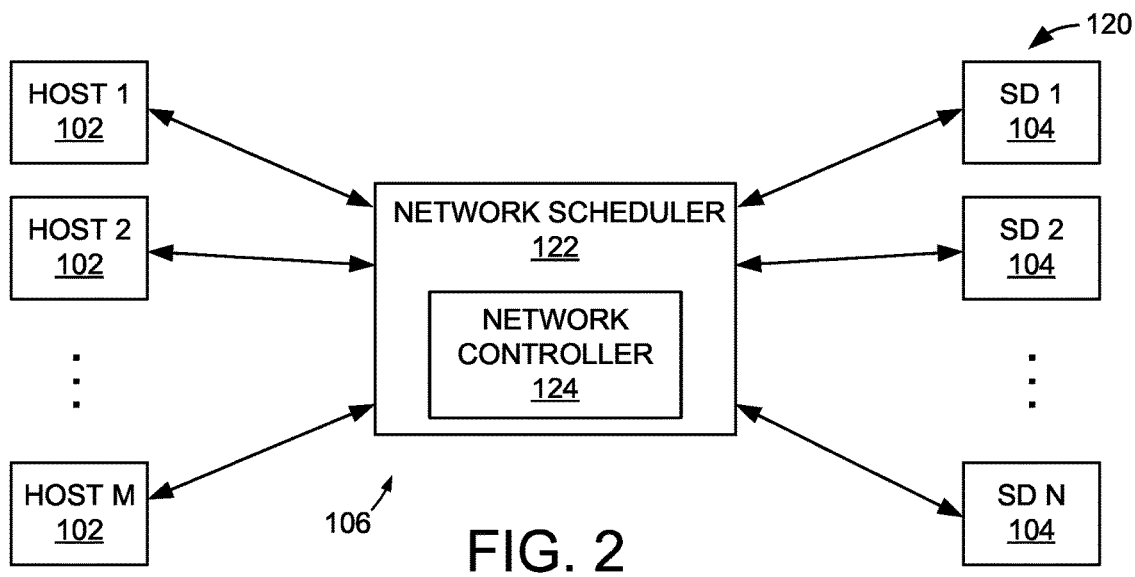
FIG. 2 depicts a block representation of portions of an example data storage system arranged in accordance with some embodiments.

FIG. 2 depicts a block representation of portions of an example data storage system 120 similar to the system 100 of FIG. 1. In FIG. 2, a centralized network component (scheduler) 122 schedules and conducts assorted operations between a plural number M hosts 102 and a plural number N data storage devices (SDs) 104. While a single network component 122 is shown, multiple components can be alternatively be used to concurrently, sequentially, or individually handle, control, and process activity between the respective hosts 102 and data storage devices 104. The network component (scheduler) 122 in some embodiments takes the form of a network server with one or more programmable processors and associated memory, program instructions and other circuit elements necessary to carry out the described functions.

It is contemplated that the network component 122 can schedule activity not associated with a host request, such as initialization of newly connected devices, maintenance of memory, background data operations, and firmware upgrades. As a non-limiting example, the network component 122 may employ a centralized network controller 124 to carry out redundant array of independent devices (RAID) processing that mirror data, stripe data, and/or generate parity data across the respective storage devices 104.

The network controller 124 can further be configured to execute various error correction code generation and/or utilization to rebuild data suffering an error/failure. The network controller 124 can conduct device initialization that involves, for example, loading of boot information, such as tables, codes, certificates, maps, and firmware. It is contemplated that the network controller 124 executes firmware upgrades and/or alterations.

Assorted security protocol and aspects can be generated, assigned, and/or carried out by the network controller 124. For instance, the controller 124 can conduct cryptographic operations on data, create passwords, and/or verify certificates of various devices 104, hosts 102, and data. The responsibilities of the network component 122 can allow the downstream devices 104 to efficiently carry out the tasks assigned by the upstream network component 122, such as storing or retrieving data to satisfy a host 102 request, conducting garbage collection background operations, or moving data to a different memory. In some cases, higher level tasks can be divided into smaller subsets of operations which are then transferred for execution by the individual devices.

The capabilities of the network controller 124 can be workload dependent, so that the controller can operate at peak performance and/or efficiency when workloads are below a threshold volume, but with degraded performance above the threshold value. As an example, the network controller 124 can process requests, generate tasks to be completed by downstream devices 104, and transfer data with maximum potential performance, such as error rate, latency, and pending queue size, while the volume of host-generated requests and data from downstream devices 104 is below a threshold volume. Once the workload of the network controller 124 exceeds the threshold, such as when pending activity volume and/or processing demands of active activities dynamically change, the controller 124 can suffer from degraded performance, such as increased latency and/or error rate. Hence, the centralized network component 122 can be considered a performance bottleneck in certain conditions.

It is noted that the addition of extra centralized processing components can mitigate performance degradation during high workload conditions. Yet, the incorporation of additional centralized components, such as in a server, node, or switch, can add complexity and degrade reliability as the number of connected hosts 102 and/or volume of system activity increases. Accordingly, various embodiments are directed to intelligently identifying/predicting the occurrence of performance bottlenecks in centralized network components such as at 122 and subsequently assigning one or more tasks previously assigned to the components to downstream elements, such as the data storage devices 104. This allows the system to adaptively respond to dynamic changes in workloads while alleviating bottleneck conditions.

Figure 3:
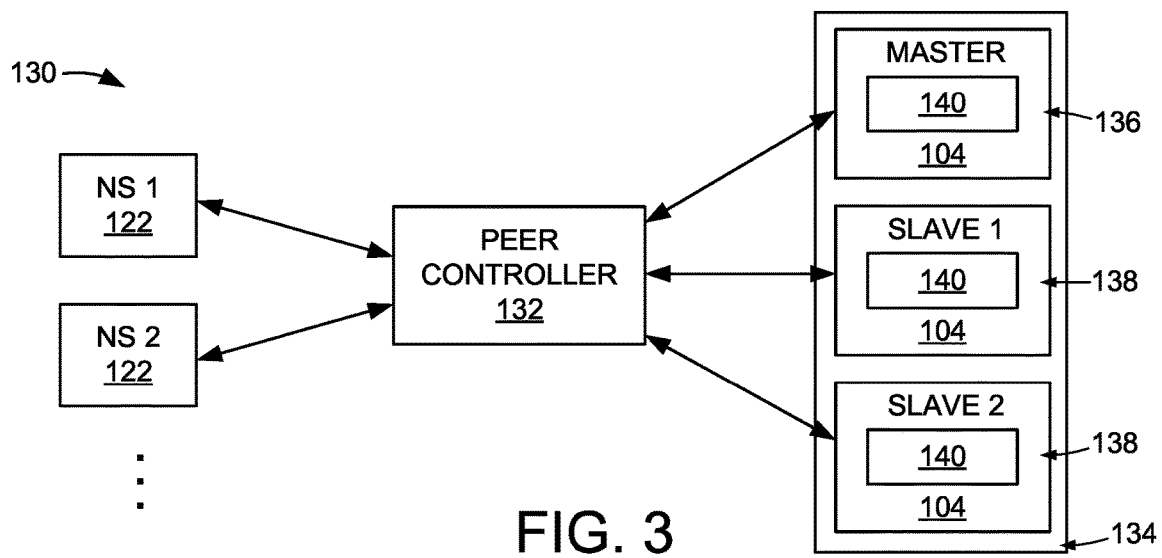
FIG. 3 depicts a block representation of portions of an example data storage system configured and operated in accordance with assorted embodiments.

FIG. 3 depicts a block representation of another example data storage system 130 configured to optimize dynamic network workloads in accordance with various embodiments. The system 130 is similar to the systems 100, 120 discussed above in FIGS. 1-2 and includes number of network schedulers 122 and storage devices 104 as described previously. The network schedulers are denoted as NS 1, NS 2, etc.

A peer controller circuit 132 is operationally disposed between the upstream network schedulers 122 and the downstream storage devices 104. The controller circuit 132 can constitute a separate set of hardware, such as a server, or can constitute a portion of other elements in the system 130, such as but not limited to a hardware or software module executed as part of a selected one or more of the NS 1, NS 2 schedulers or the various data storage devices, etc.

As explained below, the peer controller circuit 132 operates to translate operational conditions to performance bottlenecks and deviations of tasks from the upstream network components 122 to the downstream data storage devices 104 to prevent or mitigate degradation to system 130 performance. The circuit 132 correlates logged system 130 activity and model data to identify/predict current and future workloads to the central network components 122 as well as tasks that can be deviated to the data storage devices 104 for execution to decrease the workload and/or performance degradation risk to the network components 122.

The peer controller circuit 132 can further operate to create peer device groups 134 among the respective storage devices 104, in which case a set of peer level devices are operationally grouped to carry out various assigned tasks. While not limiting, in some cases a master-slave relationship may be established so that one selected device from the group, such as master device 136 (also sometimes referred to as a primary device), directs execution of the various tasks by slave devices 138 (also sometimes referred to as secondary devices).

For clarity, the assignment of a master device 136 and one or more slave devices 138 in a peer group 134 allows for local adaptation to changing operating conditions to carry out the assigned task from the network component 122 while satisfying normal data access and memory maintenance operations. For instance, the master device 136 assigned by the peer circuit 132 to carry out the task diverted from the network component 122 can utilize a local device controller 140 associated with the master device 136 to generate, schedule, and assign sub-tasks to the corresponding controllers 140 of the slave device(s) 138 to efficiently execute and complete the assigned task without degrading the ability to complete non-task activity, such as data access requests, background memory operations, and data maintenance.

It is contemplated that the various tasks, sizes of peer groups, designations of primary and secondary devices, time limits provided for the completion of tasks, and similar parameters may be selected such that the anticipated or detected bottleneck in operational performance at the network controller is avoided or reduced while at the same time maintaining the ongoing data transfer performance of the data storage devices at desired levels (e.g., at or above a predetermined threshold level, etc.).

As shown, the creation of multiple separate logical peer groups 134 allows separate master devices 136 to control and direct satisfaction of the respective assigned tasks with the assistance of slave devices 140 as commanded by the master device 136. In other words, separate peer groups 134 can conduct concurrent and/or sequential execution of different tasks respectively diverted from the upstream network component 122. The utilization of local device controllers 140 to intelligently prescribe commands to be carried out by slave devices 138 to accomplish the assigned tasks allows for maintenance of data storage device 104 capabilities for satisfaction of non-task related activity prescribed by the upstream components 122, such as data writes, data reads, and data relocation.

It is contemplated that the respective peer groups 134 are dynamic and can change over time to accommodate changing operating conditions. For instance, a peer group 134 can increase in size, change assigned task, or pause operation to allow other, non-task commands to be conducted by the constituent data storage devices 104. The peer circuit 132 can monitor and control the various aspects of the respective peer groups 134 over time. A decrease in workload for the upstream network components 122 can prompt the cancellation of a peer group 134 or the alteration of an assigned task while the originally assigned task is diverted back to the network component 122 for completion.

Figure 4:
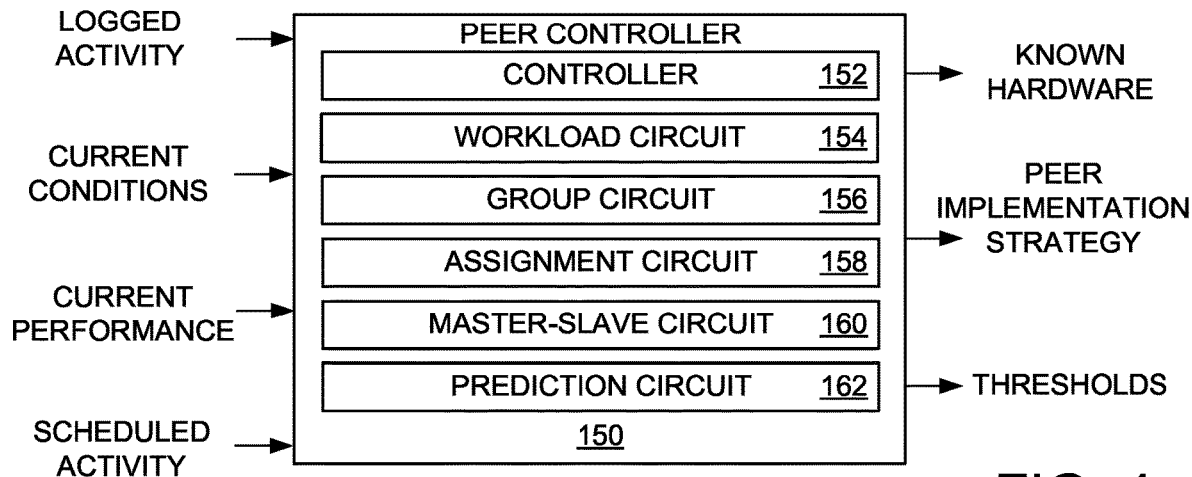
FIG. 4 depicts a block representation of an example peer circuit capable of being employed in the data storage system of FIG. 3.

FIG. 4 depicts a block representation of an example peer controller 150 that can be employed in a distributed data storage system in accordance with various embodiments. The peer controller 150 is similar to the peer controller 132 in FIG. 3 and can be configured as hardware and/or software/firmware resident in any aspect of a data storage system. As an example, the circuit 150 can be circuitry of a printed circuit board located alone and connected to assorted components of a system 130 or positioned within a component of the system 130, such as a host 102, network component 122, or data storage device 104. Additionally or alternatively, the circuit 150 may be a software/firmware module executed by an appropriate programmable processor to carry out the described functions. In some cases, the peer control circuit may form a portion of the network controller, or may be realized using one (or more) of the processors of the data storage devices.

The peer controller 150, also referred to as a peer control circuit, is shown to include a local controller 152 that processes input information, such as logged system activity, pending requests, system configurations, and component capabilities, to generate a peer implementation strategy that involves at least the prescription of certain tasks that normally would be completed by upstream network components to downstream data storage devices. The peer implementation strategy can have one or more operational thresholds that trigger deviation of one or more tasks to a group of one or more devices.

It is contemplated that the peer implementation strategy prescribes particular data storage devices to be master devices that direct the completion of an assigned task and slave devices that simply execute commands from a master device without generating, scheduling, or controlling other devices of a peer group. The number, types and involvement of the respective storage devices will arise based on the requirements of a given detected or predicted bottleneck condition.

The local controller 152 can operate alone, or in combination with other circuitry, to generate, maintain, and execute the peer implementation strategy. Although not required or limiting, the controller 152 can utilize a workload circuit 154 to identify a performance bottleneck that is occurring or imminent anywhere in a distributed data storage system. The workload circuit 154 can translate current operating conditions, such as error rate, latency, data throughput, metadata creation, and data mapping, into operational capabilities of upstream network components.

Such capabilities can be compared with scheduled system activity, such as memory maintenance operations, memory refresh, firmware upgrades, new device initialization, and background data operations, along with pending host-generated data access requests to determine if a strain on network component performance is likely. For example, detection of relatively high volumes of pending host-generated requests, scheduled memory/device operations, and/or processing intensive data accesses by the workload circuit 154 can be compared to performance capabilities of network components relative to historical and/or recent performance metrics, such as average error rate or average request satisfaction latency, to determine if the network component will experience lower than average performance, such as if capabilities are exceeded or likely to be met with currently assigned tasks.

The identification of network components nearing, or exceeding, operational capabilities to the detriment of average component performance metrics allows the peer controller circuit 150 to intelligently divert one or more tasks from upstream network components for execution by downstream data storage devices to reduce the workload on the network components and maintain an average performance of the distributed data storage system over time. While some embodiments simply utilize the computing capabilities of a downstream data storage device, such as a local controller, memory, and/or buffer, alone, other embodiments assign peer groups of downstream data storage devices to accomplish an assigned task diverted from the upstream network components. Such peer group can provide more robust capability to satisfy an assigned task without degrading downstream device performance, which creates a seamless transition of the task from network components to the downstream devices.

A group circuit 156 can operate to analyze and prescribe data storage device peer groupings that provide optimal task satisfaction without jeopardizing the average performance of the devices of a peer group. The group circuit 156 can continually, sporadically, or routinely evaluate the current performance of various data storage devices to determine what processing capabilities are available and what devices can operate in conjunction to provide optimal processing and completion of at least one assigned task. The group circuit 156 can assess any number and type of performance metrics, such as processing capacity, error rate, data access latency, type of data stored in the device, encryption protocol, and error correction protocol, along with scheduled device activities, such as background memory schedule, firmware upgrades, and data maintenance operations, to determine the capacity to complete a task diverted from an upstream network component.

Operation of the group circuit 156 can provide a combination of processing capabilities among multiple separate data storage devices to efficiently complete a diverted task without jeopardizing the average performance of the respective peer group devices, such as data access latency, error rate, and data rebuild time. For instance, the group circuit 156 combines complementary, but separate, data storage devices into a logical peer group to provide a diverse range of performance capabilities to give the highest chance of maintaining average data access request service times, such as different devices having different error rates, processing latency, processing peak speeds, and security protocol.

The ability to assess the capabilities of different data storage devices over time allows the group circuit 156 to provide dynamic logical peer groupings that evolve as conditions change to consistently provide an optimized combination of capabilities to satisfy an assigned task diverted from an upstream network component while satisfying normal, host-generated data access requests to the constituent memories of the peer group with average, or better, performance. It is noted that the group circuit 156 can concurrently assign, monitor, and maintain multiple different logical peer groups provides a diverse range of capabilities to satisfy multiple diverted tasks without jeopardizing or degrading the average data access performance of the constituent data storage devices.

The dynamic assignment and maintenance of logical peer groups allows a distributed data storage system to intelligently adapt to changing data access and component capabilities to alleviate high traffic and/or processing demands on a network component without sacrificing real-time data access performance. Much like how the group circuit 156 evaluates and optimizes logical peer groupings of data storage devices, an assignment circuit 158 can set what tasks are to be diverted from an upstream network component to a peer group. The assignment circuit 158 can assign, pause, and alter what tasks a peer group is assigned, which allows for intelligent utilization of storage device processing capabilities without degrading performance of host-generated data access requests.

The assignment circuit 158 can evaluate any number and type of current and predicted operational parameters to prescribe network component tasks, such as RAID operations, error correction code generation, data rebuilds, error recovery, security operations, firmware upgrades, and device initialization, to one or more logical peer groups set by the group circuit 156. As a non-limiting example, the assignment circuit 158 can determine the current and/or future workloads and processing capacity of upstream network components, individual data storage devices, and logical peer groups as a whole to assign the diversion of one or more tasks from network components to a logical peer group.

In some embodiments, the assignment circuit 158 prescribes a series of tasks to be completed by a single peer group, which minimizes delay and maximizes processing capability of a peer group. Other embodiments of the assignment circuit 158 prescribes redundant tasks to different peer groups and cancels a task upon completion of the task by another peer group. The assignment circuit 158, in response to a detected or predicted change in operating conditions and/or processing capabilities, can pause execution of a task by a single data storage device or by a peer group as a whole to allow the data storage devices to exclusively process and satisfy host-generated data access requests. The ability to pause and resume satisfaction of an assigned task relative to satisfaction of host-generated data access requests can ensure no degradation of performance for data storage devices despite additional processing associated with a diverted network component task.

It is contemplated that the assignment circuit 158 alters and/or moves a task to be completed. For instance, an initially prescribed task can be changed to a different task or moved to a different peer group for completion in response to changes in operational conditions, such as processing capabilities, error rate, and data access latency. The dynamic assignment of peer groups and tasks to be completed by a group can be complemented by a dynamic control scheme established and maintained by a master-slave circuit 160.

The master-slave circuit 160, in some embodiments, evaluates and maintains lists of available data storage devices eligible for master device roles or slave device roles. Such lists may correspond with one or more detected, or predicted, system performance metrics and/or metrics of individual devices of a peer group. For instance, the master-slave circuit 160 can evaluate any number of device and system performance metrics, such as error rate, latency, percentage of processing capability, queued volume, and average satisfaction time, to generate and maintain separate lists of which data storage devices are candidates for master roles that correspond with heightened processing of dividing, scheduling, and executing system tasks compared to the role of a slave that simply involves executing assigned tasks and duties. The maintenance of slave and master lists allows the peer circuit 150 to more quickly adapt to changing system conditions and host demand than if device roles were evaluated reactively after peer group performance wanes.

The ability to assign and change, data storage devices as either master devices that issue commands to satisfy a task or slave devices that execute issued commands without generating additional commands allows the peer circuit 150 to provide adaptive execution of system tasks while maintaining average performance metrics for the satisfaction of host-generated requests. In other words, the assignment and maintenance of which devices of a peer group are master devices and which devices are slave devices provides an additional layer of optimized assignments that allow for concurrent execution of host-generated data access requests and diverted network component tasks without degrading average performance metrics.

A prediction circuit 162 can input assorted current and past system operations, actions, and activity, along with model data from other memory, to forecast at least one future operational condition, data access request, or data access performance. The accurate prediction of memory, metadata, and network conditions along with data access performance allows the respective assignment of peer groups, tasks, and master/slave roles to mitigate, or completely avoid, a current, or predicted future, performance bottleneck in a network component.

The prediction circuit 162 can further forecast how long different assignments will balance processing capabilities of the data storage system with performance. That is, the prediction circuit 162 can estimate assorted different peer group, task, and master/slave assignments to determine which assignments to alter to provide optimal balance of the utilization of excess processing capabilities and risk of degrading performance of satisfying host-generated data access requests. The evaluation of multiple different assignments prescribed by other circuitry of the circuit 150 allows the circuit to quickly adjust between different assignments to provide a practical workload control and maintain operational performance without unduly stalling or degrading overall data storage system performance.

The prediction circuit 162 can detect and/or poll a diverse variety of information pertaining to current, and past, data storage operations as well as environmental conditions during such operations. Although not exhaustive, the prediction circuit 162 can receive information about the current status of a write queue, such as the volume and size of the respective pending write requests in the queue. The prediction circuit 162 may also poll, or determine, any number of system/device performance metrics, like write latency, read latency, and error rate. The version of data pending, or being written, may be evaluated by the prediction circuit 162 to establish how frequently data is being updated.

Figure 5:
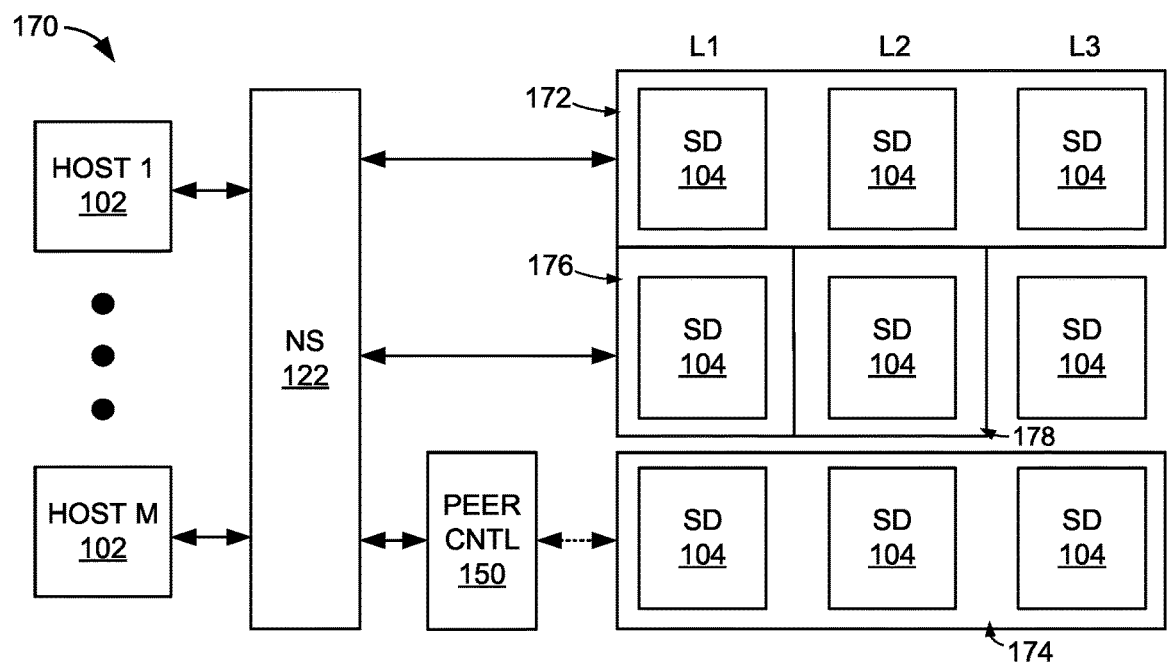
FIG. 5 depicts a block representation of portions of an example data storage system utilized in accordance with various embodiments.

FIG. 5 depicts a block representation of portions of an example distributed data storage system 170 in which the peer control circuit 150 from FIG. 4 can controllably direct one or more downstream data storage devices 104 to complete one or more tasks diverted from upstream network component(s) 122. The network component (NS) 122 can process and complete any number of tasks, as shown by solid arrows, while the peer circuit 150 diverts one or more tasks, as shown by segmented arrow, to at least one logical peer group of data storage devices 172/174.

The non-limiting peer group configuration displayed in FIG. 5 has a number of data storage devices 104 located in different physical locations (columns L1/L2/L3), such as different arrays, racks, data centers, cities, countries, continents, etc., that are logically clustered into peer groups 172 and 174. It is noted that a logical group 172/174 can consist of similar or dissimilar data storage devices 104 that are aggregated by the peer circuit 150 to complete one or more tasks diverted from the network component 122. The respective groups 172/174 may, but are not required, to have master (M) and slave (S) designations prescribed by the peer circuit 150, which correspond with which data storage device 104 generates commands to complete an assigned task and which device simply executes commands without generating new commands. Other management schemes can be employed including round-robin designations, time-based designations, address-based designations, and so on to distribute and manage the various tasks provided to the respective peer groups.

It is noted that not all available data storage devices 104 are assigned to peer groups. The availability of non-assigned devices 104 allows the peer circuit 150 to selectively add to existing logical peer groups in response to changing operational conditions. That is, the peer circuit 150 can add devices 104 not previously incorporated into a logical peer group to provide additional processing and/or data storage capabilities to optimize the concurrent execution of a diverted task along with satisfaction of host-generated data access requests while maintaining average data access request performance, such as request latency and error rate.

It is further noted that the various peer groups can overlap, constitute the same or different numbers of storage devices, can be expanded or retracted, or other adjustments made as required. In some cases, a selected level of background processing capabilities is maintained and devices are added or removed as required to maintain this selected level of processing capability. In other cases, a first peer group may be initially formed, and then an overlapping second peer group can be formed to handle additional offloaded processing tasks, with the second peer group having at least one device that is not a member of the first peer group and vice versa.

The addition of data storage devices 104 to a peer group may correspond with an alteration of the master/slave assignments. The non-limiting example shown in FIG. 5 illustrates how the first peer group 172 can expand, initially, to a second size 176 without altering the master/slave assignments and, subsequently, to a third size 178 that corresponds with a new master device and a demotion of the initial master device to a slave device. The new master device can be selected for any reason, but some embodiments reserve a data storage device with low average processing load to fill in for a peer group that is experiencing elevated volumes of host-generated data access requests during satisfaction of a task deviated from the upstream network component 122. It is noted that the assignment of a device as a master or a slave corresponds with different roles that respectively dictate whether commands are generated and issued to other devices (master) or simply executed upon receipt (slave).

The dynamic adaptations of peer group size and/or master/slave assignments is not required for each group 172/174 of a system. As shown, the second peer group 174 can remain in an original configuration during the alteration of the first peer group 172. Hence, the peer circuit 150 can make adaptive modifications to less than all the peer groups of a system 170, which can optimize the balance of available device processing capabilities with the ability to satisfy host-generated data access requests with at least historical average performance metrics.

Figure 6:
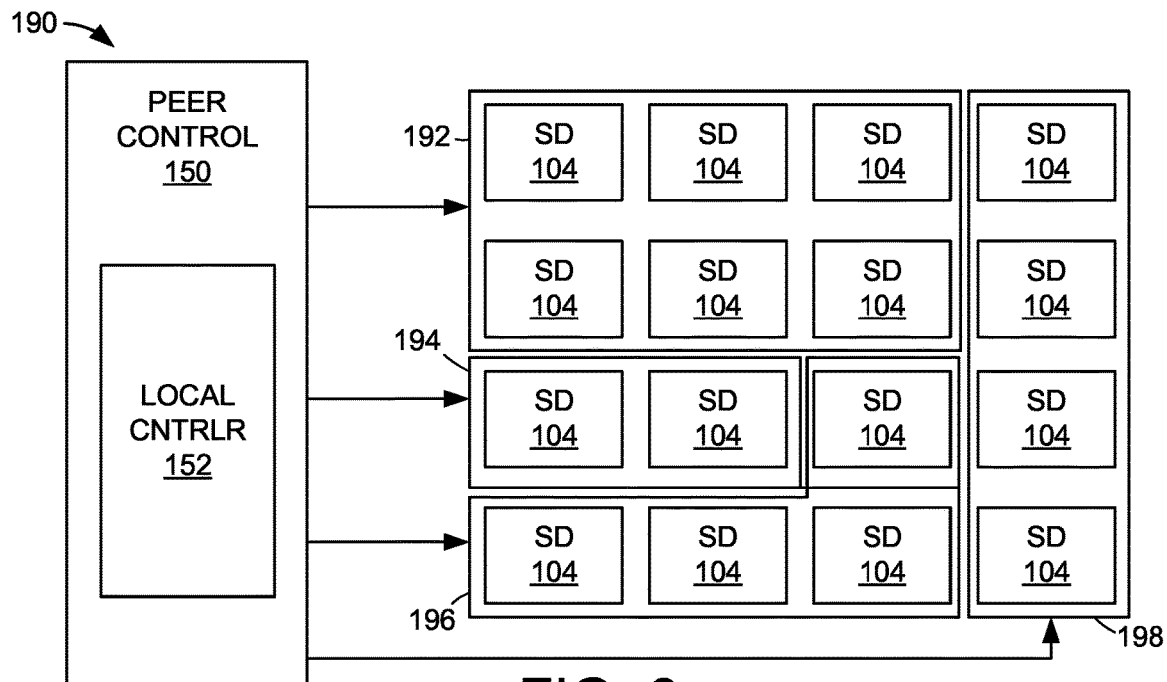
FIG. 6 depicts a block representation of portions of an example data storage system employed in accordance with assorted embodiments.

FIG. 6 depicts a block representation of another example distributed data storage system 190 that employs a peer controller circuit 150 to mitigate performance bottlenecks in upstream components 122. The non-limiting example system 190 is configured with multiple concurrent peer groups 192/194/196/198 that respectively have different tasks diverted from the upstream network component 122.

It is noted that some peer groups can share data storage devices 104, such as storage device SD-X 104 that is a member of both peer group 194 and peer group 196. Sharing of devices in this way can provide a diverse variety of task handling capabilities to the peer circuit 150. In such a shared device configuration, each peer group 192/194/196/198 has a single assigned master device and share slave devices, which allows different master devices to share the processing capabilities of slave devices without inducing performance degradation, interruption, or interference.

It is contemplated that the peer circuit 150 selectively activates the respective peer groups 192/194/196/198 in response to detected, and/or predicted, bottlenecks in network component 122 performance. For instance, the peer circuit 150 can activate a single peer group 192 in response to a future bottleneck and workload change in the network component 122 before activating additional concurrent peer groups 194/196/198 to handle and complete other tasks diverted from the network component. The ability of the peer circuit 150 to dynamically assign tasks to peer groups as well as the sequence of peer group activation in response to detected and/or predicted network component 122 performance bottlenecks provides adaptive capabilities that can alleviate different bottleneck conditions over time to reduce network controller 124 processing demand and help maintain consistent performance for data throughput.

Various embodiments construct a peer strategy with the peer circuit 150 that includes predetermined sequence of tasks assigned to particular peer groups or a sequence of peer groups sequentially organized to complete the first diverted network component task. That is, the peer circuit 150 can preset a sequence of tasks to be diverted to the first available peer group or preset a sequence of peer groups to complete the first available diverted task. Thus, the peer circuit 150 can predetermine how processing workloads can be diverted to mitigate performance bottlenecks and maintain system performance despite changing volumes of host-generated data access requests, scheduled system tasks, and/or reactive system tasks.

Figure 7:
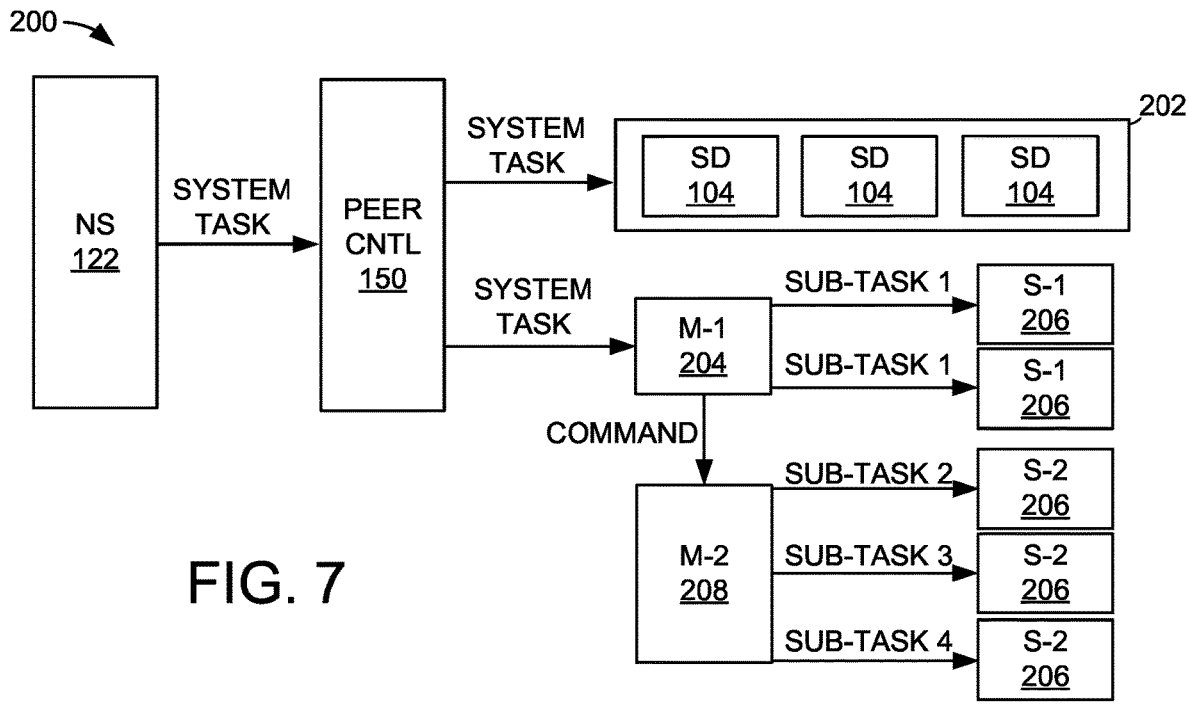
FIG. 7 depicts a block representation of portions of an example data storage system carrying out various embodiments.

FIG. 7 illustrates a block representation of portions of an example distributed data storage system 200 arranged to provide optimal balance of workload tasks to mitigate the presence of performance bottlenecks. Over time, tasks that are normally executed by an upstream network component 122 are identified as actually or potentially posing a bottleneck in system performance. Such bottleneck identification is not limited to particular performance metrics and can consist of one or more metrics. For instance, a peer circuit 150 can track increases in queued requests, average request execution time, peak latency, and volume of scheduled system tasks above a predetermined network component processing capability threshold, such as 80% of capacity, to determine that a performance bottleneck can, or will, jeopardize the ability of the system 200 to maintain an average level of performance, such as satisfying a quality of service threshold and/or deterministic window.

Other embodiments of performance bottleneck identification can involve simply balancing processing of tasks among the network component 122 and downstream peer group 202 to maintain a predetermined processing capacity range for the upstream network component 122, such as 0-50%. The identification of a performance bottleneck triggers the execution of a predetermined peer strategy that assigns one or more tasks previously scheduled for completion by the network component 122 to at least one logical peer group established to concurrently satisfy an assigned task while servicing host-generated data access requests. While not required or limiting, a peer strategy can prescribe a master device of a peer group and one or more slave devices that complement the master device to process and satisfy assigned system tasks diverted downstream.

The role of an assigned master device can involve directing operations of both completion of tasks diverted from the upstream network component and host-generated data reads and writes to a memory. Such operations can involve the generation of sub-task commands that direct slave devices to execute a particular aspect of a task and/or access request. By using the local data storage device controllers to generate, schedule, distribute, and execute sub-tasks created by a master device and carried out by slave devices, a task diverted from an upstream network component can be efficiently carried out in parallel by downstream data storage devices, which allows the respective data storage devices to satisfy host-generated data access requests and/or other tasks, such as background data operations, without degraded latency, error rate, or other performance. In other words, the intelligent dividing of a task into sub-tasks by a master data storage device corresponds with maintained data access performance metrics despite greater volumes of executed commands.

As a non-limiting example, a master device can evaluate an assigned task and divide the task into a plurality of sub-tasks that collectively accomplish the network component task. It is contemplated that a master device can have predetermined sub-tasks associated with an assigned network component task or generate new sub-tasks in response to a task assignment. A sub-task can be characterized as a processing request to be satisfied to contribute to accomplishing an assigned task. For instance, a master data storage device controller can divide RAID, error correction, data mapping, and security operations into multiple sub-tasks, such as data relocation, data generation, processing of data addresses, and packaging of data, that are distributed to select slave data storage devices for execution. The distribution of sub-tasks may coincide with an assigned execution schedule that is selected so that the collective data storage devices can satisfy host-generated data access requests concurrently with the execution of sub-tasks without degraded performance.

With greater numbers of data storage devices 104 being utilized for distributed data storage and retrieval, the peer circuit 150 can implement relatively sophisticated master/slave arrangements. For instance, the peer circuit 150 may implement a predetermined peer strategy that prescribes a multi-tiered master/slave configuration where multiple separate master devices work in concert to generate, distribute, and schedule sub-tasks from a diverted system task to slave devices for execution and completion of the system task. The non-limiting embodiment shown in FIG. 7 illustrates how a first tier master device 204 (M-1) can distribute redundant sub-tasks, such as sub-task 1, to multiple separate slave devices 206 (S-1) as well as command(s) to a second tier master device 208 (M-2) that enable the generation and distribution of sub-tasks to other slave devices 206 (S-2). It is contemplated that slave devices 206 receive sub-task requests from multiple different master devices 204/208, but such operation is not required or limiting as separation of sub-task generation and distribution to the respective master devices 204/208 can optimize overall system task completion.

The storage devices in the respective peer groups will continue to execute normal workflow operations as normal while concurrently executing the additional workload supplied by inclusion in the associated peer group. As a result, the peer circuit 150 can maintain, or improve, average data access performance metrics, such as time to completion, latency, error rate, and number of successful third-party attacks, despite changing volumes of data access requests and system tasks to be completed.

By intelligently assigning and adapting peer groups on an as-needed or as-anticipated basis, the peer groups can accomplish a diverse variety of system tasks, such as device initialization, data rebuilding, firmware upgrades, data encryption, RAID formatting, etc. through the utilization of downstream device processing capabilities without reducing the average performance metrics for host-generated data access requests, which makes the use of peer groups seamless to the upstream hosts. The same or different data communication channels can be used to provide the inter-device communications necessary to support the peer group operations.

Figure 8:
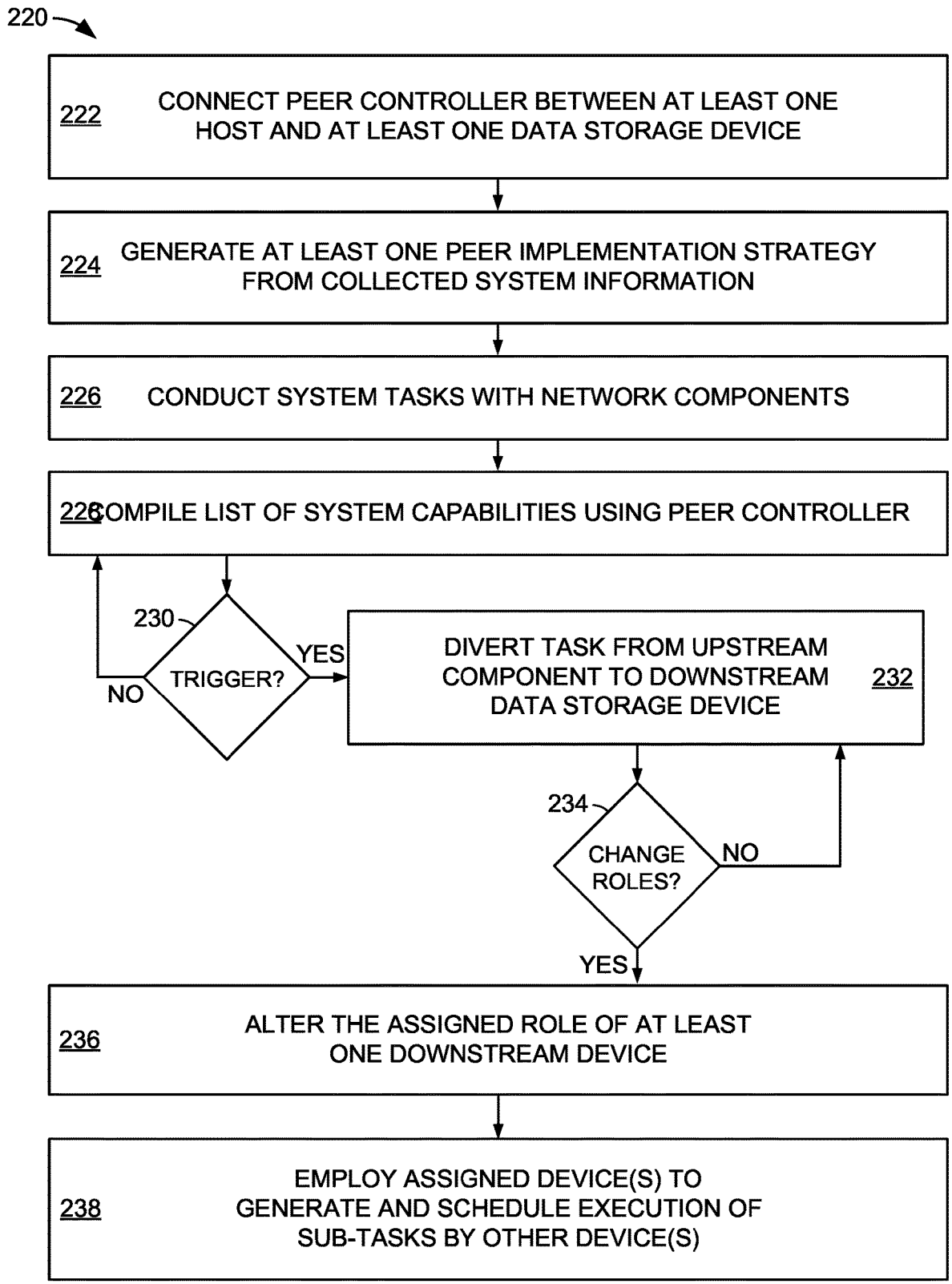
FIG. 8 is a flowchart of an example peer routine that can be executed with the respective data storage systems of FIGS. 1-7 in some embodiments.

FIG. 8 depicts an example performance routine 220 that can be carried out by the assorted embodiments of FIGS. 1-7 to provide optimized completion of system tasks in conjunction with host-generated data access requests. In step 222, a distributed data storage system has one or more a network component connected between multiple hosts and a data storage repository consisting of multiple separate data storage devices. A peer circuit connected to portions of the distributed data storage system translates any number and type of input information into a peer strategy in step 224 that proactively prescribes at least one task of the network component that can be diverted to a logical peer group of downstream data storage devices in response to predetermined operational triggers.

The peer strategy generated in step 224 can prescribe any number and type of actions to prevent, or at least mitigate, performance degradation in an upstream network component. For instance, the peer strategy of step 224 can set which data storage devices are logically grouped, which peer group is assigned a task, which task is diverted from a network component to a peer group, which devices are master devices, and which devices are slave devices. Some embodiments of the peer strategy prescribe operational identifiers that indicate a performance bottleneck is present, imminent, or likely in the future, such as queue volume, computed component workload, available processing capability, changes in performance metrics, pending network activity, or newly connected hosts/devices.

Generation of the peer strategy allows network components to conduct a variety of system tasks in step 226, such as, but not limited to, RAID operations, error correction assignment, data rebuild, device initialization, data security operations, and firmware upgrades. It will be noted that these various operations may be for an entirely different set of data storage devices that are not a part of the existing peer group.

The task execution of step 226 is expected to be conducted solely with upstream network component processing capabilities, such as controllers, microprocessors, and programmable circuitry, prior to resulting data, maps, tables, firmware, and information being moved to permanent destinations in one or more data storage devices. That is, the tasks executed in step 226 are intended to be processed, scheduled, and distributed by upstream network components, which may generate information and data that is subsequently stored in a downstream data storage device.

Any number and type of network component tasks can be completed in step 226 while the peer circuit evaluates the workload of various system components in step 228 to compile a real-time list of system processing capabilities. The compilation of the list of processing capabilities in step 228 allows the peer circuit to identify the current percentage of upstream system tasks that can be diverted to downstream peer groups to allow upstream network components to operate at maximum efficiency and/or accommodate relatively large volumes of system traffic. The compiled list in step 228 may allow the peer group to proactively change portions of the peer strategy, such as master device assignments or peer groupings, as well as which tasks are diverted to which groups.

In some embodiments, the list generated and maintained in step 228 can have dynamic resolution based on the current, and projected, system conditions. For instance, relatively low system workload may correspond with the peer circuit evaluating processing capability with a device resolution while relatively high system workload may correspond with a peer group resolution or the data repository as a whole resolution. The capability to adapt how the peer circuit evaluates processing allows for intelligent utilization of low workload conditions to compile more robust selection of peer groups, system tasks, and master device assignments.

While step 228 may continuously, sporadically, routinely, or randomly generate and update a processing capability list that is organized in a predetermined fashion, such as by percentage of total capability, processing rate, chronologically, master devices, slave devices, or by peer group, the peer circuit can determine if an operational trigger is present, imminent, or reliably forecasted in decision 230. The peer circuit can continuously, sporadically, or routinely conduct one or more tests, analysis of operational conditions, or comparison of past performance to scheduled activity to determine if a predetermined operational trigger in a network component meets a trigger set in the peer strategy, which indicates degradation in processing capabilities and/or real-time ability to maintain data access reliability, security, and speed.

A detected, identified, or predicted bottleneck in one or more network components in decision 230 prompts step 232 to divert one or more tasks from the network components to a predetermined peer group of data storage devices. It is noted that a peer group can comprise one or more data storage devices that are assigned a master/slave relationship by the peer strategy. That is, the peer strategy can proactively correlate deviated tasks with particular logical peer groups that have the detected, or predicted, processing capability to complete the deviated task without degraded performance for satisfaction of host-generated data access requests. Some embodiments of step 232 assign a master device for the selected peer group based on the list compiled in step 228. For instance, a peer circuit can consult a compiled list of processing capabilities to select a master device to direct the satisfaction of a task assigned in accordance with the peer strategy. Such master device selection can be intelligently based on a variety of different criteria, such as greatest available processing capability, lowest average percentage of processing capacity over time, or largest processing capability.

The assignment of a task from a network component to a peer group allows the network component to continue servicing system operations by completing tasks. The concurrent processing of system tasks by the assigned peer group and the network components provides an efficient balance of the utilization of system processing capabilities without jeopardizing the ability of downstream data storage devices to satisfy data access requests with maintained data access performance, reliability, and security metrics. It is contemplated that step 232 is conducted to divert multiple different tasks from the network component to one or more logical peer groups for execution.

Some embodiments divert a task, in accordance with a peer strategy, with a set execution time, such as after a predetermined amount of time, in response to an operational trigger, like a processing capacity or queue volume, or after a previous task is completed. The peer strategy can prescribe the concurrent, sequential, or random processing of diverted system tasks by different logical peer groups. A task assigned by the peer circuit from an upstream network component to a downstream logical peer group may have predetermined execution instructions, such as schedule, distribution, and overall time to completion. However, embodiments can direct a master device of a logical peer group to organize and utilize the respective slave devices of the peer group to execute a task in the most efficient manner.

Any number of tasks can be diverted and satisfied with step 232 before decision 234 evaluates if current device roles are optimal to maintain data access performance and satisfaction of future tasks diverted from upstream network components. As a result of the evaluation of device roles in decision 234, altered device roles can be prescribed in step 236. In other words, decision 234 may determine if different master and/or slave role assignments can increase the ability of a peer group to concurrently satisfy host-generated data access requests and any diverted system tasks. Altered device roles may be based on the compiled list of real-time processing capabilities from step 228 as well as the detection, or prediction of new devices being initiated into the peer group, new tasks being assigned to the peer group, and/or changes in workload volume to the peer group.

In response to an alteration of master/slave roles in step 236, such as addition of a master device or change of a single master device for a peer group, or if no role alteration is chosen from decision 234, step 238 employs the local controller of the assigned master device to intelligently generate, schedule, and distribute sub-tasks to selected slave devices to satisfy diverted system tasks. It is contemplated that a master device sends sub-tasks to less than all the slave devices of a peer group, which allows other slave devices to solely satisfy host-generated data access requests. It is further contemplated that a master device is utilized as a first tier with another master device of the peer group handling some aspect of satisfaction of system tasks and/or completing host-generated data access requests.

Embodiments of step 238 involve a master device intelligently splitting an assigned system task into separate sub-tasks that can be concurrently, or sequentially, processed and completed by the local controller of selected slave devices. The division of a task into sub-tasks may involve redundantly issuing sub-tasks to different slave devices and cancelling a sub-task in response to completion by another device. The ability to intelligently divide a task into different, or redundant, sub-tasks can balance the processing usage of the logical peer group to allow host-generated data access requests to be satisfied with average, or better, performance metrics, such as error rate, latency, and overall time to satisfaction.

The execution of step 238 utilizes the respective local controllers of data storage devices of the peer group to concurrently process the assigned system task along with host-generated data access requests. It is noted that step 238 may process a system task or data access request alone at times prescribed by the peer circuit while processing both a task and data access request at other times. Hence, the peer circuit can track, monitor, and evaluate the prescribed satisfaction of diverted tasks over time and make adaptations to assigned peer group, task processing schedule, and master/slave assignments to ensure data access performance is maintained at, or above, averages, which provides a seamless utilization of peer group processing to upstream hosts.

Through the execution of routine 220, a distributed data storage system can provide an intelligent balance of processing utilization across multiple separate devices. The generation of a peer strategy and compilation of real-time processing capabilities for various system devices allows for efficient and effective diversion of system tasks downstream. The ability to analyze and alter roles of peer group data storage device between master activity and slave activity allows a peer circuit to maintain data access performance while completing diverted system tasks to avoid clogging upstream network controllers. By identifying the need for activities to be conducted and which master/slave configuration is optimal for current, and predicted future, system load, conditions, and reliability, activities, such as security, RAID, caching, encryption, error recovery, tiering, and data transformation operations, can be intelligently conducted so that the upstream network controller can focus on completion of prioritized system tasks, such as maintaining root of trust, firmware, and data throughput.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:

connecting at least one host to a plurality of data storage devices via a network controller, the network controller having a network processor, each of the plurality of data storage devices having a storage processor;

forming a peer group of at least two of the plurality of data storage devices in response to a detected processing bottleneck associated with the network processor, a selected one of the plurality of data storage devices designated as a primary device and each of the remaining plurality of data storage devices designated as a secondary device;

offloading a processing task from the network processor to the storage processor of the primary device to alleviate the detected processing bottleneck;

using the storage processor of the primary device to divide the processing task into multiple subtasks and to offload the multiple subtasks onto the processor of each of the secondary devices for execution thereby, the processor of the primary device coordinating overall execution of the processing task, wherein the peer group and the processing tasks are selected to maintain data transfer performance of the plurality of data storage devices above a selected threshold level.

2. The method of claim 1, further comprising assigning a new data storage device to the peer group and, designating the new data storage device as a second primary device and demoting the primary device to a secondary device, the second primary device assuming coordination of the overall execution of the processing task.

3. The method of claim 1, wherein the processing task comprises a data rebuilding operation for data stored across the plurality of data storage devices.

4. The method of claim 1, wherein the processing task comprises a cryptographic operation associated with data stored by the plurality of data storage devices.

5. The method of claim 1, wherein the processing bottleneck is detected using an operational trigger event that predicts an increase in workload for the network controller.

6. The method of claim 1, wherein the processing task comprises authenticating a newly added data storage device to the system.

7. The method of claim 1, wherein a peer control circuit is used to form the peer group responsive to an evaluation of available resources of the respective plurality of data storage devices.

8. The method of claim 1, wherein the peer group is characterized as a first peer group, and the method further comprises forming a second peer group to concurrently process a second processing task offloaded from the network controller, the second peer group including at least one and less than all of the devices in the first peer group so that the second peer group has at least one device that is not a member of the first peer group and vice versa.

9. The method of claim 1, wherein each secondary device in the peer group executes tasks assigned by the primary device without generating any commands for other devices of the peer group to execute.

10. The method of claim 1, wherein the processing task executed by the peer group comprises an operation to process data stored by a different number of storage devices not included within the peer group.

11. An apparatus comprising:

a network controller having a network processor;

a plurality of data storage devices each having an associated storage processor and configured to transfer data to and from the network controller via a network connection at or above a selected data transfer rate; and a peer control circuit configured to form a peer group of a selected number of the data storage devices to autonomously execute a processing task offloaded from the network controller responsive to a detected trigger indicative of an operational bottleneck condition associated with the network controller, the peer control circuit designating a first device from the peer group as a primary interface device the remaining devices from the peer group as secondary devices, the primary interface device delegating subtasks for execution by the remaining devices in the peer group and coordinating overall execution of the processing task which is carried out while maintaining the transfer of the data to and from the network controller at or above the selected data transfer rate.

12. The apparatus of claim 11, wherein the primary interface device is a first primary interface device, and the peer control circuit is further configured to designate a selected device from the peer group as a second primary interface device, the first and second master devices concurrently operating to respectively coordinate different processing tasks offloaded from the network controller.

13. The apparatus of claim 11, wherein the peer control circuit generates a peer strategy in response to detected activity between at least one host and the plurality of data storage devices.

14. The apparatus of claim 11, wherein the peer strategy proactively sets the operational trigger and the peer group.

15. The apparatus of claim 11, wherein the peer control circuit maintains a list of processing capabilities of each of the data storage devices and uses this list to form the peer group and to designate the primary interface device therein.

16. The apparatus of claim 11, wherein the peer group is characterized as a first peer group, the peer control circuit forms a second peer group to concurrently process a second processing task offloaded from the network controller, and the second peer group constituting a second number of the plurality of data storage devices that includes at least one and less than all of the selected number of devices in the first peer group.

17. The apparatus of claim 11, wherein each secondary device in the peer group executes tasks assigned by the primary interface device without generating any commands for other devices of the peer group to execute.

18. The apparatus of claim 11, wherein the processing task comprises processing RAID data that are subsequently striped across a different group of storage devices not included within the peer group.

19. The apparatus of claim 11, wherein the data storage devices are solid-state drives (SSDs) operated in accordance with the Non-Volatile Memory Express (NVMe) protocol, and the processing task executed by the peer group are associated with a namespace that extends across the SSDs within the peer group.

20. The apparatus of claim 11, wherein the processing task comprises an authentication operation carried out to authenticate a newly added data storage device to the network controller.

* * * * *